No. 643,895. Patented Feb. 20, 1900.
T. GOHLKE.
CARD CUTTING MACHINE.
(Application filed Feb. 17, 1899.)
(No Model.) 5 Sheets—Sheet 1.
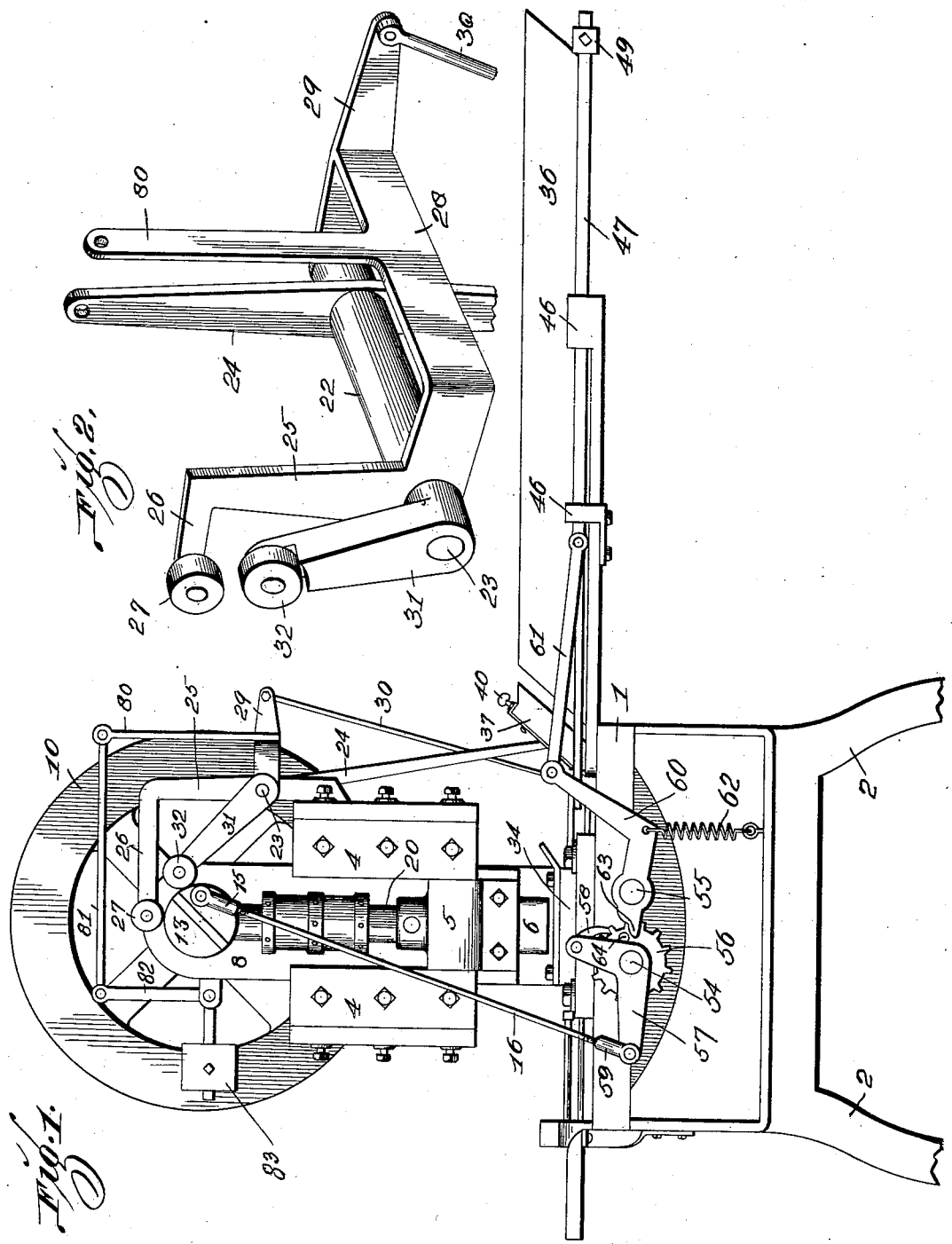

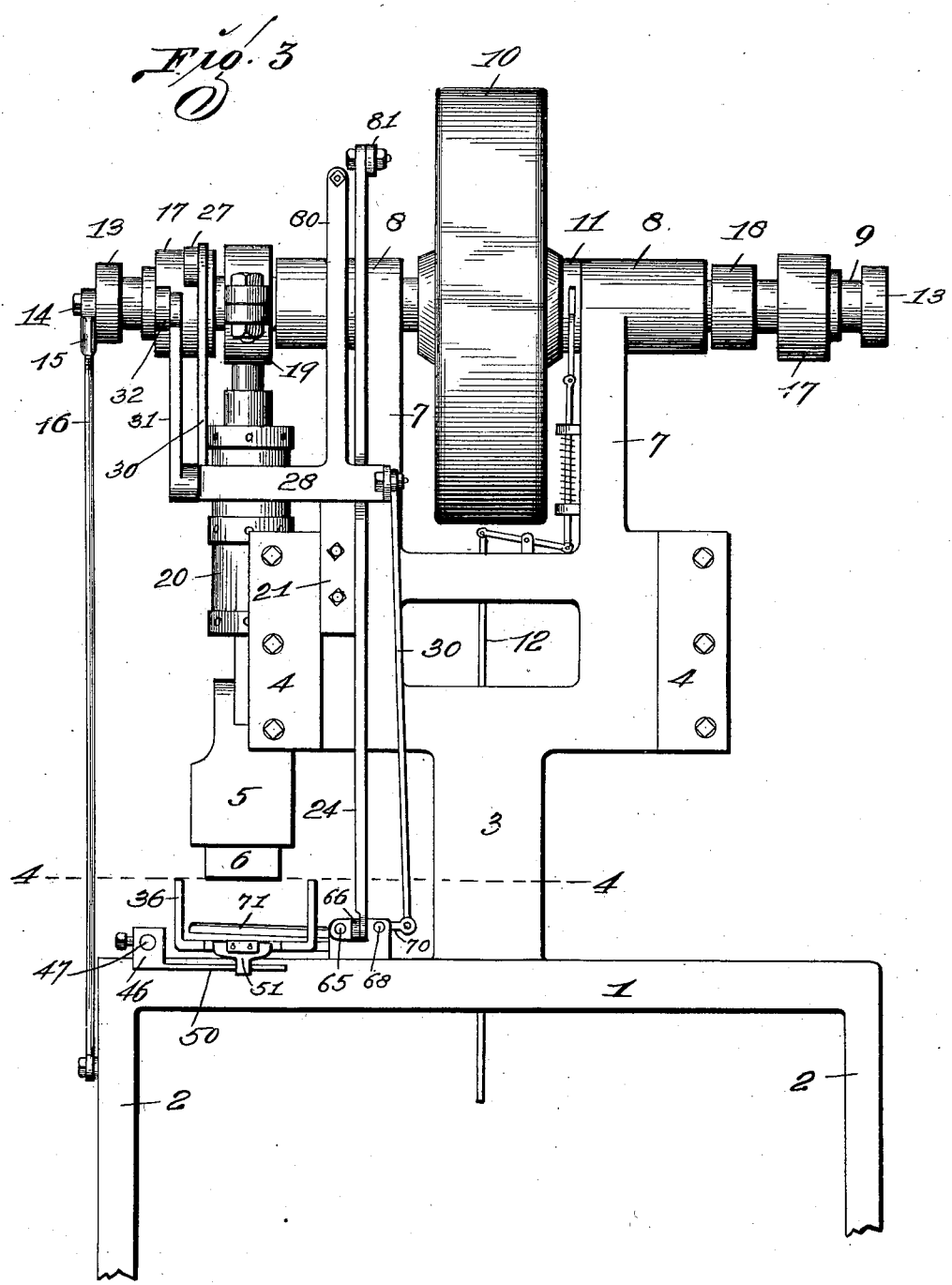

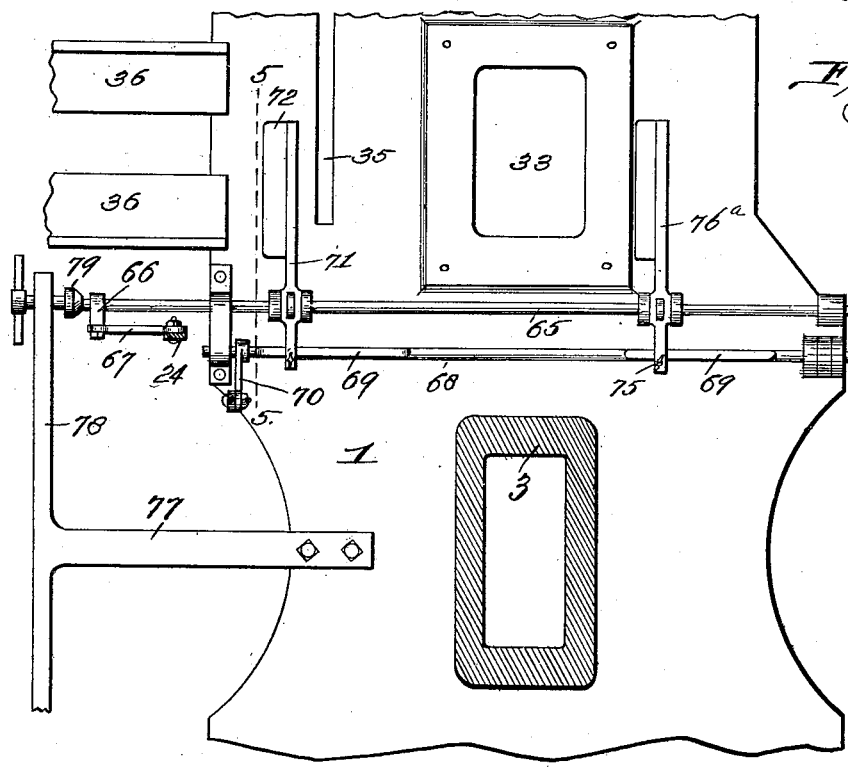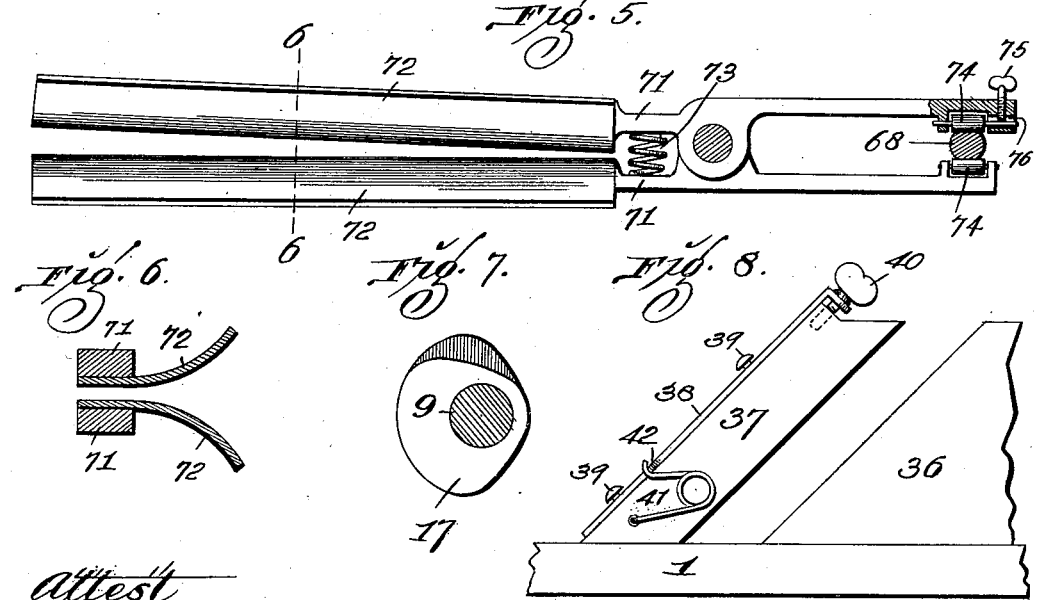

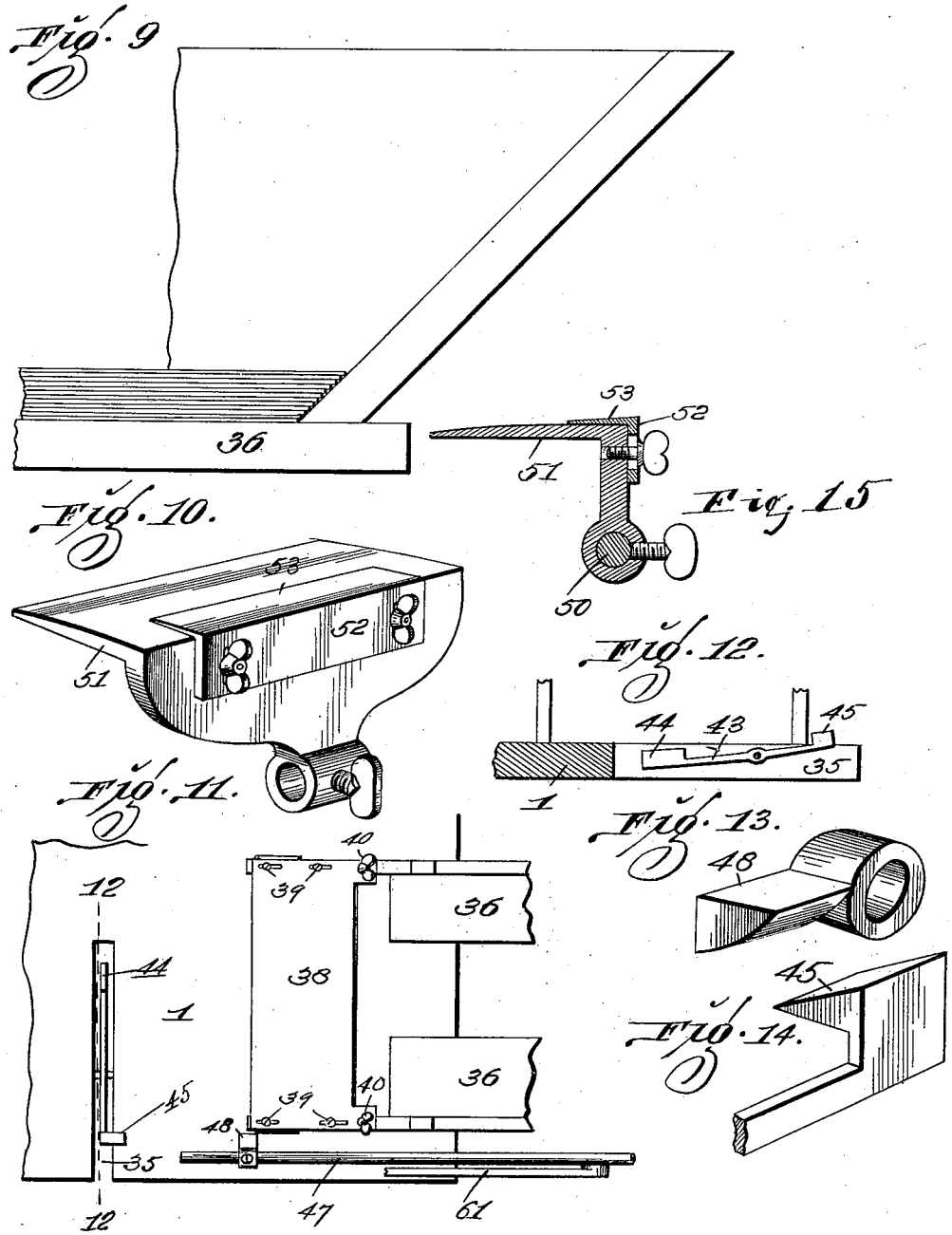

No. 643,895. Patented Feb. 20, 1900.
T. GOHLKE.
CARD CUTTING MACHINE.
(Application filed Feb. 17, 1899.)

(No Model.) 5 Sheets—Sheet 5.

Attest:
Alfred A. Eicker
Maude Griffin

Inventor:—
Theodore Gohlke.
By Higdon & Longan Atty's.

THE NORRIS PETERS CO., PHOTO-LITHO., WASHINGTON, D. C.

UNITED STATES PATENT OFFICE.

THEODORE GOHLKE, OF ST. LOUIS, MISSOURI.

CARD-CUTTING MACHINE.

SPECIFICATION forming part of Letters Patent No. 643,895, dated February 20, 1900.

Application filed February 17, 1899. Serial No. 705,942. (No model.)

*To all whom it may concern:*

Be it known that I, THEODORE GOHLKE, of the city of St. Louis, State of Missouri, have invented certain new and useful Improvements in Card-Cutting Machines, of which the following is a full, clear, and exact description, reference being had to the accompanying drawings, forming a part hereof.

My invention relates to card-cutting machines; and it consists of the novel construction, combination, and arrangement of parts hereinafter described and claimed.

Figure 16:
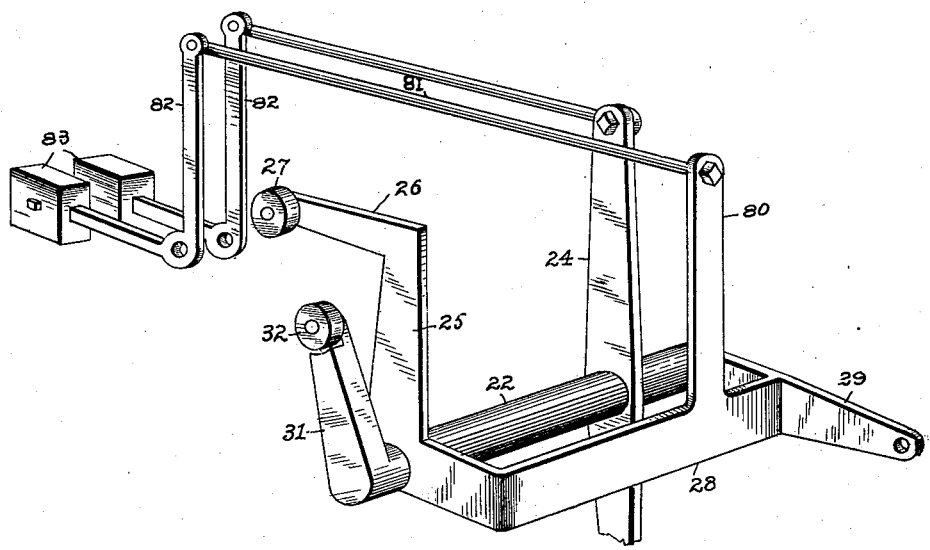
Figure 17:
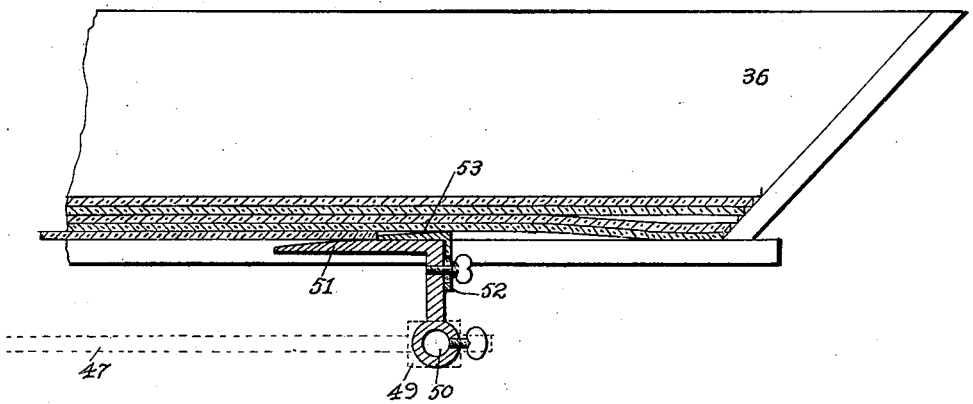

Figure 1 is a side elevation of my improved card-cutting machine. Fig. 2 is a view in perspective of a pair of bell-cranks made use of in carrying out my invention. Fig. 3 is a front elevation of the machine, the mechanism on one side thereof being removed in order to more clearly illustrate the same. Fig. 4 is an enlarged horizontal sectional view taken approximately on the line 4 4 of Fig. 3. Fig. 5 is an enlarged sectional view taken approximately on the line 5 5 of Fig. 4 and illustrating a pair of gripping-fingers. Fig. 6 is a vertical sectional view taken approximately on the line 6 6 of Fig. 5. Fig. 7 is a side elevation of a double eccentric. Fig. 8 is an enlarged side elevation of the forward end of the chute in which the cardboard strips are placed previous to their delivery beneath the card-cutting die. Fig. 9 is an enlarged sectional view of the rear end of this cardboard-strip chute. Fig. 10 is a view in perspective of a feeding device made use of in feeding out the cardboard strips one at a time. Fig. 11 is a plan view of the forward end of the cardboard-strip chute and showing a stop located in front of said chute. Fig. 12 is a transverse sectional view taken approximately on the line 12 12 of Fig. 11. Fig. 13 is a view in perspective of a depression-finger made use of in carrying out my invention. Fig. 14 is a view in perspective of the lug carried by the end of the stop device illustrated in Fig. 12 and which is engaged by the depression-finger. Fig. 15 is a vertical sectional view of the feeding device shown in Fig. 10. Fig. 16 is a perspective view of the bell-cranks, arms, connecting-rods, and weights made use of in my invention. Fig. 17 is a vertical sectional view of the feeding device shown in the act of feeding one or more of the strips of cardboard from the chute.

In the construction of my improved card-cutting machine a flat table 1 is mounted upon suitable legs 2, and extending upwardly from the center of the table 1 is a hollow standard 3, and at the upper end of said hollow standard 3 are the laterally-projecting vertically-arranged bearings 4, through which slide the blocks 5, that carry the dies 6. Extending upwardly from the bearings 4 is a pair of standards 7, with the upper ends of which are formed integral horizontally-alined bearings 8. In said bearings 8 is mounted for rotation the shaft 9, and loosely arranged upon said shaft between said bearings 8 is a wheel 10, which performs the functions of both belt and balance wheels. A clutch 11, of any suitable construction, is carried by one side of this wheel 10, said clutch being adapted to engage an oppositely-arranged clutch upon the shaft 9, and a spring-actuated rod 12 extends downwardly through the hollow standard 3 to the floor, thus providing means for throwing the machine into or out of operation.

The construction and operation of the mechanism on each side of the machine are identical. Therefore the subsequent description will be limited to the mechanism upon one side.

Located upon the outer end of the shaft 9 is a disk 13, and extending outwardly from the face thereof is a wrist-pin 14, upon which is journaled a head 15, in which is seated the upper end of the rod 16. Rigidly fixed upon the shaft 9, a short distance from this disk 13, is a double eccentric 17, one of the faces thereof being slightly longer than the opposite face, and rigidly fixed upon the shaft 9, to one side of this eccentric 17, is an eccentric 18, around which passes a strap 19. This eccentric 18 is in direct vertical alinement with the vertically-moving block 5, and a pivoted connecting-rod 20 connects said block 5 with the strap 19.

Rigidly fixed to the front face of the upper end of the vertical bearing 4 is a plate 21, the upper end of which is formed into a horizontally-arranged bearing 22, and passing through said bearing is a shaft 23. Rigidly carried by the shaft 23, at the inner end of the bearing 22, is a vertically-arranged bar 24, the lower end of which extends downwardly to a point adjacent the top of the table 1 and the upper end of which extends to a point a slight distance above the shaft 9. Journaled upon the shaft 23, at the outer end of the bearing 22, is a bell-crank 25, the upper end of which is provided with an integral arm 26, the outer end of which carries a roller 27. This roller 27 rides directly upon the long face of the double eccentric 17. Integral with the forwardly-projecting portion of the bell-crank 25 is a bar 28, the same extending in front of the bearing 22, and integral with the end of said bar 28 is a longitudinally-extending bar 29, the rear end of which is journaled upon the shaft 23 outside the bar 24, and the forward end of said bar 29 is pivotally connected to the upper end of a vertically-arranged rod 30. Rigidly fixed upon the outer end of the shaft 23, outside the bell-crank 25, is an arm 31, the upper end of which carries a roller 32, that rides directly upon the short face of the eccentric 17.

Formed in the table 1, immediately beneath the die 6, is an aperture 33, and seated upon the table around said aperture is a die-plate 34, the same being provided with an aperture to correspond with the die 6.

Formed in the table 1, immediately in front of the aperture 33, is a transverse slot 35, and fixed to and extending forwardly from the front edge of the table, in direct alinement with the aperture 33, is the cardboard-strip chute 36. Fixed to and extending upwardly from the table 1, in direct alinement with the vertical side walls of the chute 36, is a pair of upwardly and rearwardly extending blocks 37, on the top sides of which is arranged a plate 38. Screws 39 pass through slots formed in the edges of this plate 38, said screws being seated in the blocks 37, and the upper end of said plate 38 is turned downwardly, and set-screws 40 pass through said downwardly-turned end and are seated in the upper ends of the blocks 37. Springs 41 are located upon the outside faces of the lower ends of the blocks 37, and the free ends of said springs 41 engage lugs 42 formed on the outside edges of the plate 38, the tendency of said springs 41 being to throw the plate 38 upwardly. Fulcrumed in the slot 35, below the face of the table 1, is a stop-bar 43, with one end of which is formed integral an upwardly-projecting lip 44, and integral with the outer end of said stop-bar 43 is a lug 45, having an inclined top face.

Arranged to slide in suitable bearings 46 at the outside of the cardboard-strip chute 36 is a rod 47, the forward end of which extends to a point in front of the blocks 37, and said forward end is provided with a depression-finger 48, having an inclined lower face, which engages against the inclined upper face of the lug 45 when the rod 47 is moved rearwardly. The rear end of this rod 47 extends to a point in front of the chute 36, and adjustably located upon said front end is a block 49, which is provided with a laterally-projecting finger 50. Adjustably located upon this finger 50 is the feeding device, (seen in Figs. 10 and 15,) which feeding device consists of an angle-block 51, the horizontal portion of which is provided with a curved top face, and arranged for vertical adjustment upon the vertical member of this angle-block is a plate 52, the same being provided with a laterally-extending knife-edged plate 53, the same lying directly upon the top surface of the rear edge of the horizontal portion of the angle-block 51. This knife-edged plate 53 is in direct horizontal alinement with the top surface of the bottom of the chute 36, and when the entire device is carried rearwardly by the movement of the rod 47 the knife-edged plate 53 engages the lower one of the strips in the chute 36.

Projecting laterally from the side of the table 1, at a point immediately beneath the center thereof, is a pair of trunnions 54 and 55. Rotatably arranged upon the trunnion 54 is a ratchet-wheel 56, and rotatably arranged upon said trunnion 54 outside said ratchet-wheel is a bell-crank 57. Pivotally held to the end of the vertical member of said bell-crank 57 is a gravity-pawl 58, and pivotally held to the outer end of the horizontal member of said bell-crank is a head 59, in which is seated the lower end of the rod 16, previously mentioned.

Fulcrumed upon the trunnion 55 is a bell-crank 60, to the end of the vertical member of which is fulcrumed a connecting-bar 61, the forward end of which is pivotally connected to the rod 47. A retractile coil-spring 62 is secured to the elbow of this bell-crank 60, the opposite end of said spring being secured to a suitable point on the frame of the machine. Formed integral with the free end of this bell-crank 60 is a lug 63, the same extending beyond the periphery of the ratchet-wheel 56, and said lug is intended to be engaged by a pin 64, carried upon the side of said ratchet-wheel 56.

Extending longitudinally across the machine, at a point between the opening 33 therein and the hollow standard 3, is a rod 65, the same being arranged to slide in suitable bearings carried by the top of the table 1, and rigidly fixed upon the front end of said rod 65 is a laterally-projecting block 66, and connecting this block 66 with the lower end of the vertically-arranged bar 24 is a connecting-rod 67. Extending parallel with the rod 65 and arranged for rotation in suitable bearings carried by the top of the table 1 is a rock-shaft 68, the opposite sides of the forward and rear end portions of which are flattened, as indicated by 69. Rigidly carried by the forward end of this rock-shaft 68 is a laterally-projecting arm 70, to the outer end of which is pivotally connected the lower end of the rod 30, previously mentioned.

A pair of bars 71 are journaled upon the rod 65 adjacent the front bearing for said rod, which pair of bars extend laterally in front of the chute 36, and the meeting faces of said bars are provided with guide-strips 72, the same curving outwardly and away from each other. Interposed between the bars 71, adjacent the point where they are journaled upon the rod 65, is an expansive coil-spring 73, and the rear ends of these bars 71 are extended rearwardly past the rock-shaft 68, and carried by the extreme rear ends of said bars 71 and operating upon the flat surfaces 69 of the rock-shaft 68 are antifriction-rollers 74. Passing through the extreme outer end of the top one of the bars 71 is a set-screw 75, the same engaging upon the spindle of the upper one of the rollers 74. This spindle is located in a vertically-arranged slot 76, and by means of said set-screw 75 the wear or lost motion between the rock-shaft 69 and the rollers 74 may be taken up.

A pair of bars 76ª, identical with the bars 71 just described, is arranged upon the rod 65 immediately behind the aperture 33, and the two sets of bars 71 and 76ª operate simultaneously in the same manner and perform the function of clamping and feeding fingers. A bracket 77 extends forwardly from the center of the table 1, said bracket being provided in its forward end with a lateral extension 78. An adjustable stop 79 is carried by the rod 65, which limits the forward movement of said rod 65.

Extending upwardly from the bar 28 is an arm 80, and extending rearwardly from the upper end of this arm and also the bar 24 are connecting-rods 81, that are pivotally connected to the upper ends of bell-cranks 82, that are fulcrumed to the rear side of the bearing 8, the horizontal arms of said bell-cranks being provided with weights 83. These weighted bell-cranks cause the bar 24 and bell-crank 25 to reassume their normal positions after they have operated, as hereinafter described.

The operation is as follows: A number of cardboard strips are located in the chute 36, after which the machine is set in operation, and with each revolution of the shaft 9 the dies 6 will pass downwardly through the die-plate 34 and the rod 16 will be vertically reciprocated. With each upward movement of said rod 16 the bell-crank 57 will be actuated and the pawl 58, carried thereby, will engage successively in the notches of the ratchet-wheel 56. When said ratchet-wheel 56 has made one revolution, the pin 64, carried thereby, will engage the lug 63, formed on the bell-crank 60, and said bell-crank will be actuated, and in so doing the horizontally-arranged rod 47 will be thrown rearwardly a slight distance. With this rearward movement of the rod 47 the forward edge of the knife-edged plate 53 will engage the lower one of the cardboard strips and the same will be moved rearwardly through the chute, and in so doing the rear end of said strip will pass beneath the plate 38, located upon the upper side of the blocks 37, which plate has previously been set by the operation of the thumb-screws 40 to allow but a single cardboard sheet to pass beneath the lower edge of said plate. When the rod 47 moves rearwardly, the depression-finger 48, carried thereby, will engage the lug 45, depressing the same, together with the outer end of the stop-bar 43, thus elevating the inner end carrying the lip 44, and thus a stop to limit the movement of the rear end of the cardboard strip is formed. When the rod 47 moves forwardly or to its original position, the stop-bar will assume its normal position by gravity and the lip 44, carried thereby, will descend into the slot 35. As the lowermost one of the cardboard strips is thus moved forwardly or started out of the chute it passes between the pair of bars 71, carrying the guide-strips 72, which pair of bars 71 are normally held apart by the action of the expansive coil-spring 73. With the next rotation of the shaft 9 the elongated portion of the eccentric 17 strikes the roller 27, thus actuating the bell-crank 25 and causing the rod 30 to lower a slight distance. When said rod 30 lowers, the rock-shaft 68 is partially rotated or rocked, and by so doing the rounded portions of the rock-shaft 68 between the flattened portions 69 thereof bear against the oppositely-arranged antifriction-rollers 74, thus throwing the same apart and causing the opposite ends of the bars 71 to close and grip upon the forward end of the lowermost one of the cardboard strips or the one that has been started from the chute 36. The instant after this operation takes place the shorter face of the eccentric 17 strikes the roller 32, and as a result of this engagement the shaft 23 is slightly rocked. The lower end of the bar 24, carried by the shaft 23, is moved forwardly a short distance, and thus the bars 71, which now perform the function of feeding-fingers, are moved forwardly toward the die-plate, carrying with them the lowermost cardboard strip. When the rollers 27 and 32 ride off from the high portion of the double eccentric 17, the rock-shaft 68 returns to its normal position simultaneous with the rearward movement or the return to its normal position of the rod 65. Thus the lowermost cardboard strip is fed onto the die-plate intermittently, and the double eccentric 17 is so arranged upon the shaft 9 relative to the eccentric 18, that controls the movement of the die 6, as that said die 6 passes into the die-plate and cuts the card from the cardboard strip the instant that said cardboard strip comes to a stop in its rearward movement, and during the time the die 6 passes downwardly through the cardboard strip to cut the card therefrom and while it is being elevated the clamping-fingers or the bars 71 are returning to their forward position to again engage the cardboard strip and move the same rearwardly while the die is above and out of said card.

It is essential that the double eccentric be so constructed as that the clamping-fingers engage the card at the instant the die starts through said card and also at the instant that said die is elevating said card. This insures a perfectly-cut card, and the cards can be cut from the cardboard strip with very little waste. The waste or that portion of the strip that remains after the cards have been cut therefrom is engaged by the pair of clamping bars or fingers 76ª and discharged at a point behind the machine.

There is one more tooth in the ratchet-wheel 56 than there are cards that are cut from a single strip, the pin 64 on said ratchet-wheel 56 being directly opposite the extra tooth. Consequently the die 6 will pass through the die-plate without cutting a card from the strip just after the strip has passed beneath said die and while the feeding mechanism is starting a new cardboard strip out from the chute 36.

Cardboard strips of different lengths may be passed through my improved machine by merely making use of a ratchet-wheel 56 corresponding to the number of cards that can be cut from a cardboard strip. By means of the knife-edged plate 53 and the adjustable plate 38 but a single cardboard strip is started from the chute at a time. Therefore the machine cannot become choked or inoperative by the feeding in of more than one strip at a time.

A card-cutting machine of my improved construction is applicable for cutting all kinds of round-cornered cards, is positive in action, automatic in feed, and very rapidly accomplishes the work required.

I claim—

1. In a card-cutting machine, the combination with a suitable card-cutting die, of a cardboard-strip chute supporting strips of cardboard, mechanism for feeding said cardboard in communication with the die, and an adjustable feeding device operated by said mechanism for delivering the cardboard strips immediately after one strip has passed from beneath the die, substantially as specified.

2. In a card-cutting machine, the combination with a suitable card-cutting die, of an intermittent cardboard-strip-feeding mechanism, a cardboard-strip chute, suitable mechanism for starting the lowermost one of the cardboard strips out of said chute, and mechanism whereby the last-mentioned cardboard-strip-delivering mechanism is operated once to as many movements of the intermittent cardboard-strip-feeding mechanism as there are cards to be cut from a single cardboard strip, substantially as specified.

3. In a card-cutting machine, a suitable frame, a horizontal shaft arranged for rotation in said frame, vertically-moving card-cutting dies operated from said shaft, double eccentrics located upon said shaft, mechanism operated by said eccentrics for feeding a cardboard strip beneath the dies, a suitably-located ratchet-wheel, a pin projecting from the face of said ratchet-wheel, suitable mechanism for transmitting the rotary motion of the shaft to said ratchet-wheel, and suitable mechanism operated by said ratchet-wheel for delivering a cardboard strip from the chute to the intermittent cardboard-strip feed, substantially as specified.

4. In a card-cutting machine, a cardboard-strip-feeding mechanism, comprising a sliding rod, means for imparting movement to said rod, clamping-fingers hinged upon said rod, a rock-shaft for actuating the clamping-fingers, and means for imparting movement to said rock-shaft, substantially as specified.

5. In a card-cutting machine, a cardboard-strip-feeding mechanism constructed with a sliding rod, means for actuating said sliding rod, pairs of clamping-fingers carried by said rod, a rock-shaft, the same being provided at certain points with flattened surfaces, antifriction-rollers carried by the rear ends of the clamping-fingers, which rollers ride upon said flattened surfaces, and suitable mechanism for operating the rock-shaft the instant after motion has been imparted to the sliding rod, substantially as specified.

6. In a card-cutting machine, a cardboard-strip chute, mechanism for feeding the lowermost one of the cardboard strips from said chute, an adjustable gage arranged immediately in front of said chute, a fulcrumed stop arranged in a transverse slot in front of said gage, a bevel-faced lug integral with one end of said stop, and a depression-finger carried by the cardboard-strip-delivering mechanism for engaging said lug, substantially as specified.

In testimony whereof I affix my signature in presence of two witnesses.

THEODORE GOHLKE.

Witnesses:
M. P. SMITH,
ALBERT J. McCAULEY.